US009440643B1

(12) United States Patent
Yamazaki et al.

(10) Patent No.: US 9,440,643 B1
(45) Date of Patent: Sep. 13, 2016

(54) HYBRID ELECTRIC VEHICLE AND METHOD OF CONTROL

(71) Applicant: FORD GLOBAL TECHNOLOGIES, LLC, Dearborn, MI (US)

(72) Inventors: Mark Steven Yamazaki, Canton, MI (US); Xiaoyong Wang, Novi, MI (US); Rajit Johri, Canton, MI (US); Wei Liang, Farmington Hills, MI (US); Ming Lang Kuang, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/665,540

(22) Filed: Mar. 23, 2015

(51) Int. Cl.
| B60W 20/20 | (2016.01) |
| B60K 6/48 | (2007.10) |
| B60W 20/00 | (2016.01) |
| B60K 6/442 | (2007.10) |
| B60W 10/08 | (2006.01) |
| B60W 10/26 | (2006.01) |

(52) U.S. Cl.
CPC .............. *B60W 20/20* (2013.01); *B60K 6/442* (2013.01); *B60W 10/08* (2013.01); *B60W 10/26* (2013.01); *B60W 20/19* (2016.01); *B60W 2540/10* (2013.01); *B60W 2710/06* (2013.01); *B60W 2710/083* (2013.01); *Y10S 903/93* (2013.01)

(58) Field of Classification Search
CPC ....... B60K 6/48; B60K 6/445; B60L 11/123; B60W 50/0097; B60W 10/06; B60W 10/04
USPC ........................................ 701/22; 180/65.245
See application file for complete search history.

(56) References Cited

U.S. PATENT DOCUMENTS

| 7,678,005 | B2 | 3/2010 | Tuckfield | |
|---|---|---|---|---|
| 8,718,896 | B2 | 5/2014 | Wang et al. | |
| 8,808,140 | B2 | 8/2014 | Reed et al. | |
| 2007/0080005 | A1* | 4/2007 | Joe | B60K 6/48 180/65.245 |
| 2009/0222158 | A1* | 9/2009 | Kubota | B60L 11/123 701/22 |
| 2011/0202223 | A1* | 8/2011 | Nefcy | B60K 6/445 701/22 |
| 2012/0035795 | A1* | 2/2012 | Yu | B60W 50/0097 701/22 |
| 2013/0066495 | A1* | 3/2013 | Furuta | B60L 11/123 701/22 |
| 2014/0114512 | A1* | 4/2014 | Treharne | B60W 10/04 701/22 |
| 2014/0114513 | A1* | 4/2014 | Treharne | B60W 10/06 701/22 |

* cited by examiner

*Primary Examiner* — Yuri Kan
(74) *Attorney, Agent, or Firm* — David B. Kelley; Brooks Kushman P.C.

(57) ABSTRACT

A vehicle and a method of controlling a vehicle are provided. The vehicle may include a controller programmed to, in response to a change from a first to a second powertrain operating mode, operate an engine and electric machine to increase a state of charge target of a traction battery to increase propulsion torque available from the electric machine. The controller may be further programmed to, in response to a decrease in accelerator pedal position and a vehicle speed being less than a threshold speed while operating the powertrain in the second powertrain operating mode and the engine and electric machine are coupled via a friction element, decrease a pressure of the friction element to a first target pressure to decouple the engine from the electric machine.

18 Claims, 4 Drawing Sheets

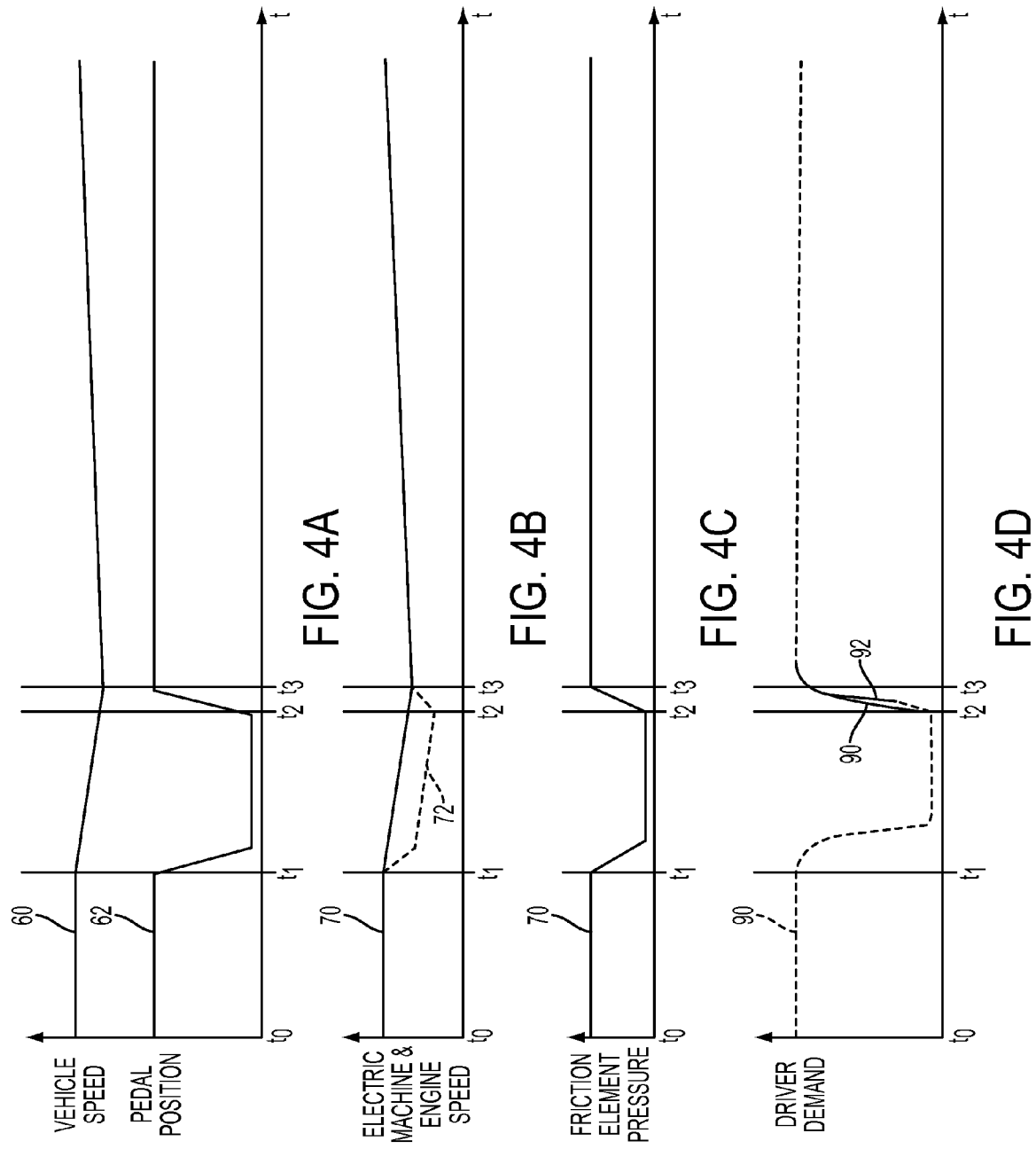

HYBRID ELECTRIC VEHICLE AND METHOD OF CONTROL

TECHNICAL FIELD

This patent application relates to hybrid electric vehicles and methods of control.

BACKGROUND

A hybrid vehicle may include an engine and traction motor that are operated to provide output torque to drive the vehicle. The respective amounts of output torque provided by each of the engine and traction motor can be dictated by operating mode. In a sport mode for example, the engine may provide more output torque than the fraction motor. In an economy mode, the traction motor may provide more output torque than the engine.

SUMMARY

In at least one embodiment, a vehicle is provided. The vehicle may include a powertrain and a controller. The powertrain may include a traction battery, an engine, and an electric machine configured to be selectively coupled to the engine. The controller may be programmed to, while operating the powertrain in a first mode and in response to a request operate the powertrain in a second mode, increase a state of charge target for the traction battery to increase propulsion torque available from the electric machine as compared to the first mode.

In at least one embodiment, a vehicle is provided. The vehicle may include a controller programmed to, in response to a change from a first to a second powertrain operating mode operate an engine and electric machine to increase a state of charge target of a traction battery to increase propulsion torque available from the electric machine. The controller may be further programmed to in response to a decrease in accelerator pedal position and a vehicle speed being less than a threshold speed while operating the powertrain in the second powertrain operating mode and the engine and electric machine are coupled via a friction element, decrease a pressure of the friction element to a first target pressure to decouple the engine from the electric machine.

In at least one embodiment, a method of controlling a vehicle is provided. The method may include in response to a change from a first mode to a second mode of operation, increasing a traction battery state of charge target. The method may further include operating a powertrain to satisfy the traction battery state of charge target, and in response to a decrease in accelerator pedal position and a vehicle speed being less than a threshold, decreasing a pressure associated with a friction element such that no torque is transmitted to the transmission by an engine while the engine continues operating.

BRIEF DESCRIPTION OF THE DRAWINGS

FIGS. 4A through 4D are corresponding time plots of an exemplary system response to an accelerator pedal input.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
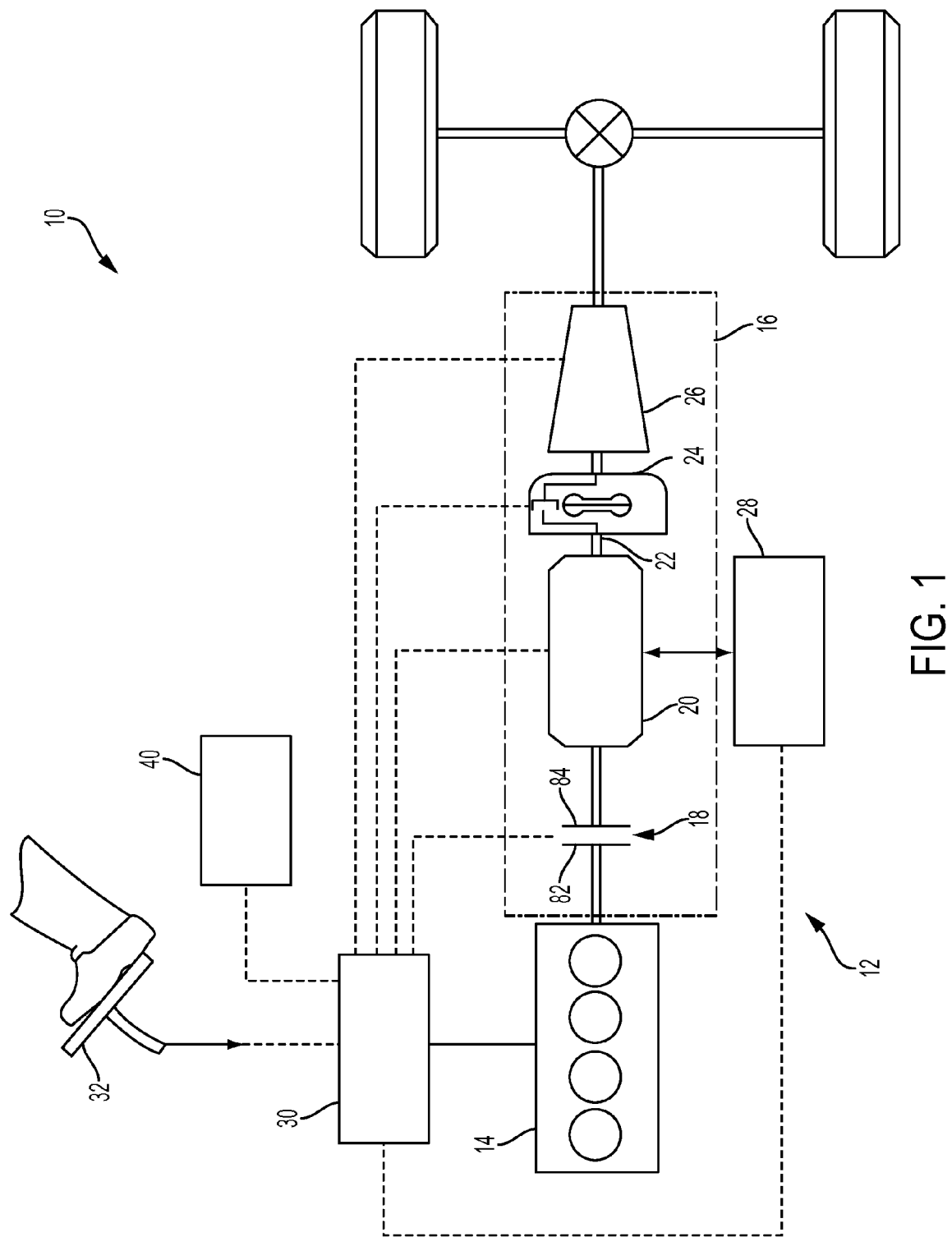
FIG. 1 is a schematic diagram of an exemplary vehicle according to an embodiment of the present disclosure.

Referring to FIG. 1, a schematic diagram of a vehicle 10 is illustrated according to an embodiment of the present disclosure. The vehicle 10 may include a powertrain 12 having an engine 14 selectively coupled to a transmission 16. The transmission 16 may include a friction element 18 such as a disconnect clutch, an electric machine 20 such as an electric motor-generator, an input shaft 22, a launch clutch or torque converter 24, and a gearbox 26. In some embodiments, a traction battery 28 may be associated with the electric machine 20. The traction battery 28 may be included with the transmission 16 or disposed proximate the transmission 16. Other configurations or arrangements of the powertrain 12 and the transmission 16 are also contemplated.

The electric machine 20 may be implemented by any one of a plurality of types of electric machines. For example, the electric machine 20 may be a permanent magnet synchronous motor. Power electronics may condition a direct current provided by the traction battery 28 to provide a three phase alternating current to the electric machine 20.

The torque converter 24 may be positioned between the electric machine 20 and the gearbox 26. The torque converter 24 may be connected to the engine 14 when the friction element 18 is at least partially engaged. The torque converter 24 may provide a hydraulic coupling between the electric machine 20 and the gearbox 26. The torque converter 24 may also perform torsional isolation to the driveline such that the driveline is isolated from disturbances.

The engine 14 may be selectively coupled to the electric machine 20 by the friction element 18 such that both the engine 14 and the electric machine 20 are capable of providing motive power for the vehicle 10. The engine 14 and the electric machine 20 may be configured to provide torque to the gearbox 26. The engine 14 may generate power and a corresponding torque that may be supplied to the electric machine 20 when the friction element 18 is at least partially engaged.

The controller 30 may operate the vehicle 10 in a hybrid mode or charge sustaining mode while the friction element 18 is at least partially engaged to couple the engine 14 with the remainder of the powertrain 12. The controller 30 may command the hydraulic pressure be supplied to components of the friction element 18, such as an actuator or a solenoid, to increase the friction element component pressure such that the friction element 18 is at least partially engaged.

Power flow from the engine 14 to the electric machine 20 or from the electric machine 20 to the engine 14 may be possible. For example, when the friction element 18 is at least partially engaged, the electric machine 20 may operate as a generator to convert rotational energy provided by an engine crankshaft operatively connected to the electric machine 20 into electrical energy to be stored by the traction battery 28.

The controller 30 may operate the vehicle 10 in an electric mode or a charge depletion mode while the friction element 18 decouples the engine 14 from the remainder of the powertrain 12. The controller 30 may command a decrease in the hydraulic pressure supplied to components of the friction element 18, such as an actuator or a solenoid, such that the friction element 18 is disengaged. The components of the friction element 18 may be completely depressurized. The electric machine 20 and/or the traction battery 28 may operate as the sole drive source for the vehicle 10 while the engine 14 is isolated from the remainder of the powertrain 12.

The controller 30 may be part of a larger control system and may be controlled by various other controllers throughout the vehicle 10, such as a vehicle system controller (VSC). It should therefore be understood that the controller 30 and one or more other controllers may collectively be referred to as a "controller" that controls various actuators in response to signals from various sensors to control functions such as starting/stopping the engine 14, pressurizing/depressurizing the friction element 18, operating the electric machine 20 to provide wheel torque or charge the traction battery 28, selecting or scheduling transmission shifts, etc.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the powertrain 12 or vehicle 10.

The controller 30 and other controllers may communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 30 may communicate with other vehicle controllers as discussed above, or directly with vehicle sensor and/or components including the engine 14, the transmission 16, the friction element 18, the electric machine 20, the driveline, the power electronics, and the braking system.

Although not explicitly illustrated, those of ordinary skill in the art may recognize that the controller 30 may be directly or indirectly actuate various parameters, systems, and/or components. The various parameters, systems, and/or components may include fuel injection timing, rate, and duration, throttle valve position, spark plug ignition timing (for spark-ignition engines), intake/exhaust valve timing and duration, timing of an engine camshaft, front-end accessory drive (FEAD) components such as an alternator, air conditioning compressor, battery charging, regenerative braking, M/G or electric machine operation, clutch element pressures for the friction element 18, torque converter by-pass clutch, torque converter 24, gearbox 26, accelerator pedal 32, and the like.

Sensors communicating input through the I/O interface may be used to indicate turbocharger boost pressure, turbocharger rotation speed, crankshaft position, camshaft position, engine rotational speed (RPM), wheel speeds, vehicle speed, engine coolant temperature, intake manifold pressure, accelerator pedal position, steering angle position, ignition switch position, throttle valve position, air temperature, exhaust gas oxygen or other exhaust gas component concentration or presence, intake air flow, transmission gear, transmission ratio, or transmission mode, transmission oil temperature, transmission turbine speed, torque converter bypass clutch status, deceleration, or shift mode, for example.

The controller 30 may interpret inputs provided by the driver to the accelerator pedal 32 as a power or torque demand or drive command to propel the vehicle 10. In general, depressing and releasing the accelerator pedal 32 may generate an accelerator pedal position signal that may be interpreted by the controller 30 as a demand for increased or decreased power/torque. The controller 30 may allocate torque commands between the engine 14 and/or the electric machine 20 to operate the powertrain 12 to satisfy the power or torque demand.

The controller 30 may be provided with an accelerator pedal map. The accelerator pedal map may provide calibrateable correlations between an accelerator pedal position, transmission gear selection, and vehicle speed to a powertrain torque or power. The controller 30 may interpret the current accelerator pedal position, and based on the vehicle speed, provide a demand for torque or power from the powertrain 12.

The vehicle 10 may be configured to operate in a first mode, referred to as a conventional mode, or a second mode, referred to as a sport mode. The accelerator pedal map may provide different correlations based on additional powertrain operating modes. The powertrain operating modes may include a first mode (conventional mode) or a second mode (sport mode). The controller 30 may be programmed to adjust or bias operation of the powertrain 12 to provide increased performance feel with a small but acceptable impact on fuel economy in response to the powertrain 12 operating in the second mode.

An operator of the vehicle 10 may be able to select the powertrain operating mode via a user interface 40. The operator of the vehicle 10, in response to selecting the second mode, may expect that the vehicle 10 will provide an increase in powertrain performance responsive to depression of the accelerator pedal 32. The increase in powertrain performance may be felt as a peppier feel or quicker vehicle acceleration due to an adjusted transmission shift schedule.

The operator of the vehicle 10 may at least partially release the accelerator pedal 32 to decrease the demand for torque or power from the powertrain 12, while the powertrain 12 is operating in the first mode. Should the traction battery state of charge and the electric machine 20 be able to satisfy the demanded powertrain torque or power associated with the decreased accelerator pedal position, the powertrain 12 may be operated in electric mode. The engine 14 may be disconnected from the remainder of the powertrain 12 by the friction element 18 while the powertrain is operated in electric mode. The friction element 18 may be completely de-pressurized and de-stroked and the engine 14 shutdown. If the traction battery 28 state of charge an electric machine 20 are unable to satisfy the demanded powertrain torque or power associated with the decreased accelerator pedal position, the powertrain 12 may continue to be operated in hybrid mode.

Figure 2A:
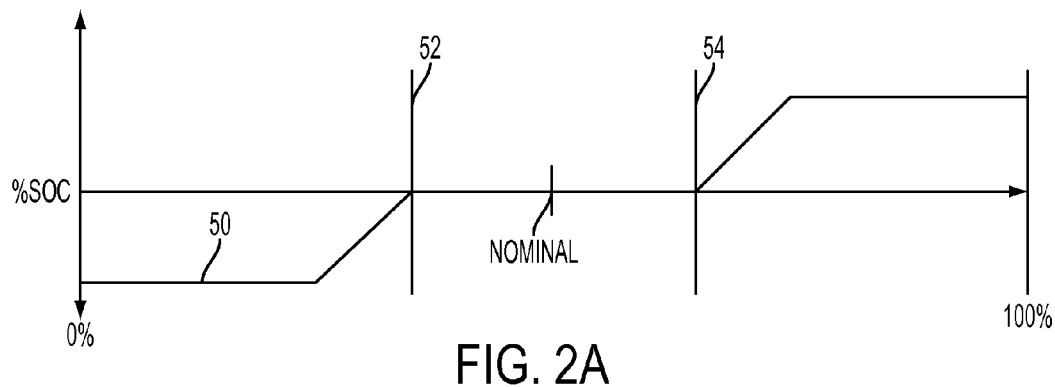
FIGS. 2A and 2B are corresponding plots of an exemplary traction battery state of charge and electric propulsion torque availability.

Referring to FIG. 2A an exemplary traction battery state of charge management strategy while operating the powertrain 12 in the first mode is shown. The traction battery 28 state of charge 50 may have a lower limit 52 and an upper limit 54. The controller 30 may attempt to maintain a traction battery state of charge between the lower limit 52 and the upper limit 54, preferably at a nominal point halfway between the limits by the operation of at least one of the engine 14 and the electric machine 20 to charge or discharge the traction battery 28.

As shown in FIG. 2A, the lower limit 52 may be 40% of the maximum traction battery state of charge and the upper limit 54 may be 60% of the maximum traction battery state of charge. Should the traction battery state of charge 50 be less than the lower limit 52, the controller 30 may bias operation of the powertrain 12 such that the traction battery 28 may be charged by the electric machine 20 via operation of the engine 14. Should the traction battery state of charge 50 be between the lower limit 52 and the upper limit 54, the controller 30 may neither charge nor discharge the traction battery 28. If the traction battery state of charge 50 be greater than the upper limit 54 the controller 30 may bias operation of the powertrain 12 such that the traction battery 28 may be discharged by providing electric power to the electric machine 20 and shutting down the engine 14.

Figure 2B:
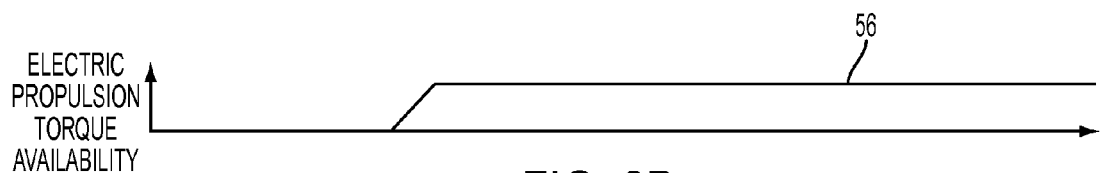

Referring to FIG. 2B, an exemplary electric assist or electric fill-in while operating a powertrain 12 in the first mode is shown. The electric assist or electric fill-in may represent an amount of electric propulsion torque availability 56 based on the traction battery state of charge and the electric machine 20 capability. The amount of electric propulsion torque availability 56 may be provided at a consistent level while the traction battery 28 state of charge 50 is above a threshold traction battery state of charge threshold. Should the traction battery state of charge 50 be less than the lower limit 52 the engine 14 may be restarted such that the powertrain 12 may be operated to charge the traction battery 28, at least until the traction battery state of charge 50 is about the lower limit 52.

The engine 14 shutdown and restart procedure may introduce considerable time lag in the delivery of torque or power to satisfy the driver expectations due to the transition from electric mode to hybrid mode. The time lag may result from the re-pressurization of the friction element 18, the spinning of the engine 14 via the electric machine 20, the starting of the engine 14, and the engine 14 reaching a synchronous speed so that the engine 14 may transmit torque. This time lag may produce a driveline disturbance and/or a shortfall in torque delivery (torque hole). The disturbance of torque hole may be disagreeable to the driver of the vehicle 10.

The operator of the vehicle 10 may perceive the time lag as more pronounced while the vehicle 10 is operating in the second mode. In an effort to minimize or eliminate the time lag associated with the engine 14 shutdown and restart procedure, the controller 30 may be programmed to adjust the traction battery state of charge target as well as to adjust the engine 14 stop-start operation.

The adjustment in the traction battery state of charge target may bias operation of the engine 14 and the electric machine 20 such that the traction battery 28 maintains a higher state of charge value. This may ensure that there is sufficient traction battery power available to provide electric assist or electric fill-in to compensate for engine lag in response to an increase in accelerator pedal position subsequent to a decrease in accelerator pedal position. The adjustment in the engine stop-start operation may prevent the friction element 18 from being fully depressurized or de-stroked and the engine 14 not shutdown responsive to a decrease in accelerator pedal position.

Figure 3A:
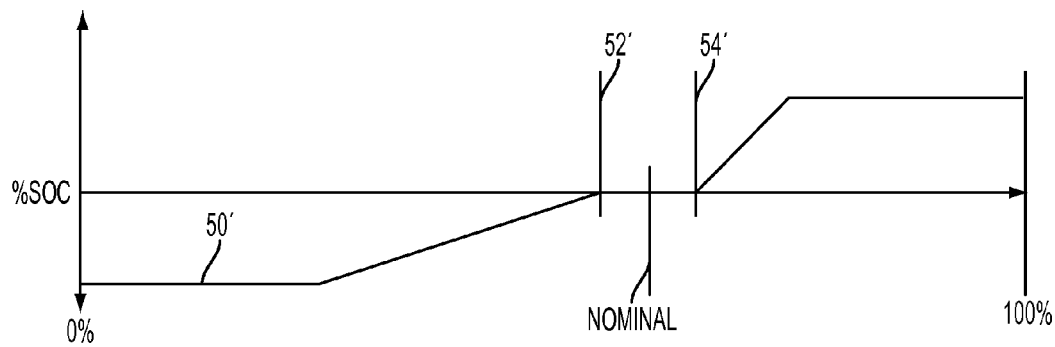
FIGS. 3A and 3B are corresponding plots of an exemplary traction battery state of charge and electric propulsion torque availability.

Referring to FIG. 3A an exemplary traction battery state of charge management strategy while operating the powertrain 12 in the second mode is shown. The powertrain 12 may transition from the first mode to the second mode in response to a request to operate the powertrain 12 in the second mode. The controller 30 may increase a traction battery state of charge target responsive to the request to operate the powertrain 12 in the second mode. The controller 30 may output for display an indicator indicative of the increased traction battery state of charge target or the increased traction battery state of charge, via the user interface 40.

The increase in the traction battery state of charge target may increase at least one of the fraction battery state of charge lower limit 52' and the fraction battery state of charge upper limit 54'. As shown in FIG. 3A, the lower limit 52' may be 50% of the maximum traction battery state of charge and the upper limit 54' may be 60% of the maximum traction battery state of charge.

The controller 30 may attempt to maintain a traction battery state of charge between the lower limit 52' and the upper limit 54'. The traction battery state of charge may be maintained by the operation of the powertrain 12 at a higher nominal point, approximately 55% of the maximum traction battery state of charge, as compared to the first mode. Should the fraction battery state of charge 50' be less than the lower limit 52', the controller 30 may bias operation of the powertrain 12 such that the traction battery 28 may be charged by the electric machine 20 via operation of the engine 14. The controller 30 may neither charge nor discharge the traction battery 28 should the traction battery state of charge 50' is proximate the higher nominal point between. Should the traction battery state of charge 50' be greater than the upper limit 54' the controller 30 may bias operation of the powertrain 12 such that the traction battery 28 may be discharged by providing electric power to the electric machine 20 and shutting down the engine 14.

Figure 3B:
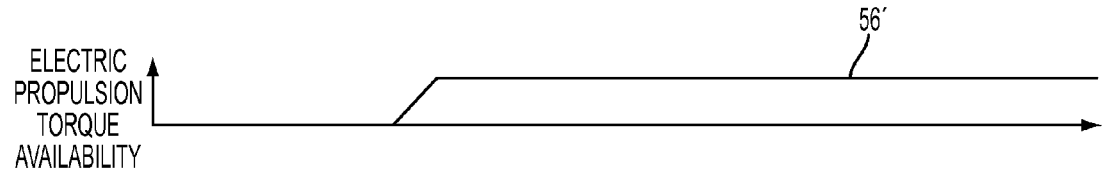

Referring to FIG. 3B an exemplary electric assist or electric fill-in while operating a powertrain 12 in the second mode is shown. The electric assist or electric fill-in may represent an amount of electric propulsion torque availability 56'. The powertrain 12 may be operated to satisfy the traction battery state of charge target such that the electric propulsion torque availability 56' for a given drive cycle is increased as compared to the electric propulsion torque availability 56 of the first mode. The amount of electric propulsion torque availability 56' may be provided at a consistent level when the fraction battery 28 state of charge 50' is above a threshold traction battery state of charge threshold.

Referring to FIGS. 4A through 4D corresponding time plots of an exemplary system response to an accelerator pedal input, while the powertrain 12 is operating in the second mode, are shown. FIG. 4A is a plot of vehicle speed 60 and accelerator pedal position 62 over time. At t0, the vehicle 10 may be traveling at a vehicle speed 60 and have an accelerator pedal position 62. Proximate t1, the operator of the vehicle 10 lift their foot from the accelerator pedal 32 (accelerator pedal tip-out) to decrease the vehicle speed 60.

The decrease in accelerator pedal position may provide a decrease in the demand for torque or power from the powertrain 12.

FIG. 4B is a plot of electric machine input speed 70 and engine speed 72 over time. Responsive to the decrease in accelerator pedal position, proximate time t1, the electric machine speed 70 and the engine speed 72 may decrease while the engine 14 may continue to be fueled and operated.

FIG. 4C is a plot of friction element pressure 80 over time. Responsive to a decrease in accelerator pedal position greater than a threshold, a vehicle speed less than a threshold, and a traction battery state of charge greater than a threshold, proximate t1, a decrease in the friction element pressure 80 may begin. The friction element pressure 80 may decrease the pressure of a component of the friction element 18 towards a first threshold. The threshold associated with the traction battery state of charge may be the traction battery state of charge target. The first threshold may be a component pressure of the friction element 18 such that components of the friction element 18 are released and held proximate a touch point.

The components of the friction element 18 may be held just shy of the touch point such that the engine 14 is disconnected from the transmission 16 while the components of the friction element 18 remain at least partially pressurized but at a lower component pressure than the component pressure sufficient to couple the engine 14 to the transmission 16. The components of the friction element 18 may not be fully depressurized or fully discharged while the components of the friction element 18 are held just shy of the touch point.

A first component 82 of the friction element 18 and a second component 84 of the friction element 18 spaced apart from the first component 82 may continue to rotate approximate a synchronous speed. The synchronous speed may be a rotational speed where the first component 82 and the second component 84 of the friction element 18 are rotating at approximately the same rotational speed. In at least one embodiment, an engine output shaft and a transmission or electric machine input shaft may continue to rotate at approximately the same rotational speed such that the first component 82 and the second component 84 of the friction element 18 are rotating at the same rotational speed.

In at least one embodiment, the friction element 18 may not disconnect the engine 14 from the transmission 16. The component pressure of the friction element 18 may be maintained such that the engine 14 remains connected to the transmission 16. This may result in a loss of fuel economy as compared to disconnecting the engine 14 from the transmission 16 and holding friction element 18 proximate the touch point, however this may be preferred in certain operating conditions such as: an accelerator pedal tip-out followed immediately by an accelerator pedal tip-in within a predetermined time period, a decrease in accelerator pedal position less than the threshold, or a decrease in accelerator pedal position greater than the threshold and a traction battery state of charge less than the lower limit 52'.

In at least one embodiment, responsive to a decrease in accelerator pedal position, a vehicle speed less than the threshold, and the traction battery state of charge greater than the traction battery state of charge target, the component pressure of the friction element 18 may decrease to a second threshold. The second threshold may be less than the first threshold. The decrease in the component pressure of the friction element 18 may disconnect the engine 14 from the transmission 16 and nearly fully depressurize or fully discharge the first component 82 and the second component 84 of the friction element 18. The engine 14 may also be de-fueled and shut down.

FIG. 4D is a plot of a driver demand 90 and the delivered torque 92 over time. The driver demand 90 may correspond to an accelerator pedal position based on the accelerator pedal map. The delivered torque 92 may be the actual torque delivered to the torque converter 24 and the gearbox 26 by at least one of the engine 14 and the electric machine 20. Proximate t1, responsive to the decrease in accelerator pedal position 62, the driver demand 90 and the delivered torque 92 may decrease.

Referring to FIGS. 4A-4D, proximate t2, the operator of the vehicle 10 may step into the accelerator pedal 32. Responsive to the increase in accelerator pedal position greater than a threshold, an increase in the friction element pressure 80 may begin. The increase in the friction element pressure 80 may increase a component pressure of the friction element 18 such that the first component 82 and the second component 84 of the friction element 18 are stroked to couple the engine 14 to the transmission 16.

The engine 14 and the electric machine 20 may be operated to satisfy the driver demand 90 corresponding to the increase in accelerator pedal position. In at least one embodiment, the electric machine 20 and the traction battery 28 may be operated to provide electric propulsion torque based on the traction battery state of charge and the accelerator pedal position to satisfy the driver demand 90 corresponding to the increase in accelerator pedal position as the engine speed 72 is increased. The electric machine 20 and the traction battery 28 may provide the electric fill-in at least until the engine speed 72 has increased such that full powertrain torque is available proximate t3.

Figure 5:
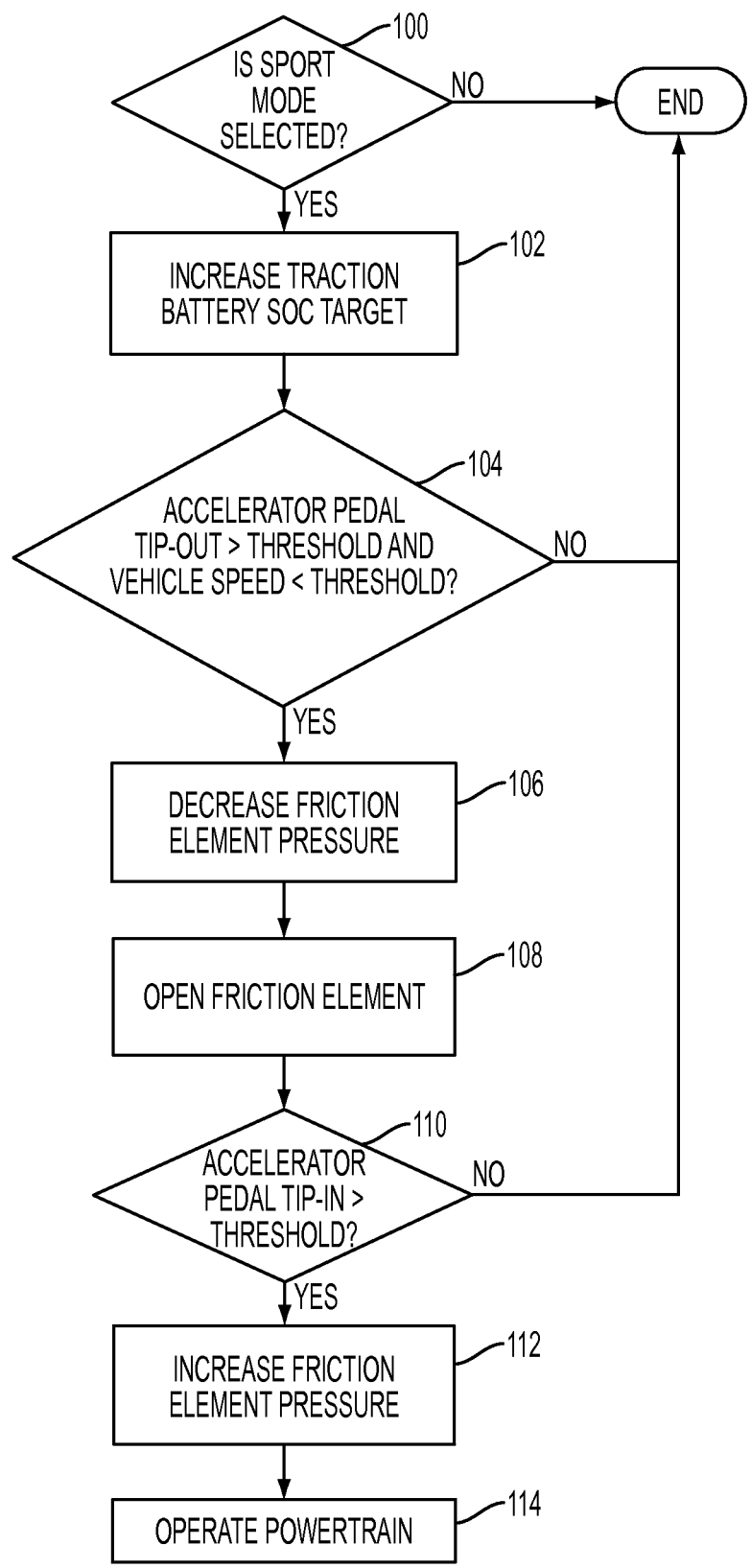
FIG. 5 is a flowchart of an exemplary method of controlling a vehicle.

Referring to FIG. 5, a method of controlling a vehicle is shown. The method may be implemented by the controller 30 or at least one processor associated with a powertrain controller or vehicle controller. The method may receive signals or data indicative of a traction battery state of charge, the powertrain operating mode, an accelerator pedal position, and a vehicle speed. At block 100, the method may assess if the operator the vehicle 10 has selected the first mode (conventional mode) or the second mode (sport mode). Should the operator of the vehicle 10 select the second mode, the method may continue to block 102.

At block 102, the method may increase a traction battery state of charge target for a given drive cycle. The traction battery state of charge target may be based on the electric propulsion torque availability and an expected engine torque delivery lag associated with disconnecting the engine 14 from the transmission 16 and reconnecting via the friction element 18 and increasing the engine speed such that torque is delivered to the transmission 16. A traction battery state of charge target associated with the second mode may be greater than a traction battery state of charge target associated with the first mode.

The increase in the traction battery state of charge target may include increasing at least one of a traction battery state of charge lower limit and a traction battery state of charge upper limit. The traction battery state of charge target may be set at a higher nominal value as compared to the traction battery state of charge target associated with the first mode. The traction battery state of charge operating window may be narrower as compared to the traction battery state of charge operating window associated with the first mode.

The powertrain 12 may be operated to satisfy the increased traction battery state of charge target. The operation of the powertrain 12 may include operating the engine 14 such that additional torque is applied to the electric machine 20 that may increase the rate at which the traction battery 28 is charged. In at least one embodiment, a load applied to the engine 14 may be increased to increase the rate at which the traction battery 28 is charged by the electric machine 20.

At block 104, in response to an accelerator pedal tip out, the method may compare the change in accelerator pedal position to a threshold and the vehicle speed to a threshold. Should the change in accelerator pedal position be greater than a threshold and the vehicle speed be less than a threshold, the method may continue to block 106. In at least one embodiment, should the change in accelerator pedal position be greater than a threshold and a powertrain torque or power be less than a threshold, the method may continue to block 106. If at least one of the change in accelerator pedal position be less than a threshold and the vehicle speed being greater than a threshold, the method may end.

At block 106, the method may decrease a friction element component pressure. The friction element component pressure may be decreased by partially de-pressurizing the friction element component. At block 108, in response to the decrease of the friction element component pressure, a first friction element component and a second friction element component may be maintained just below or proximate a touch point. The maintenance of the first friction element component and the second friction element component proximate the touch point may open the friction element 18 such that the engine 14 is proximately coupled to the transmission 16. The engine 14 may no longer be transmitting torque through the friction element 18 to the transmission 16 while a friction element component remains partially pressurized and the engine 14 may continue to be fueled and operated.

At block 110, in response to an accelerator pedal tip in, the method may compare the change in accelerator pedal position to a threshold. Should the change in accelerator pedal position be greater than the threshold the method may increase the friction element component pressure at block 112. The friction element component pressure may be increased such that the first friction element component and the second friction element component engage to transmit torque from the engine 14 to the transmission 16.

At block 112, in response to the coupling of the engine 14 to the transmission 16 by the friction element 18, the powertrain 12 may be operated to satisfy a powertrain power or torque demand associated with the accelerator pedal position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a powertrain including a battery, an engine, and an electric machine selectively coupled to the engine; and
a controller programmed to, in response to a request to transition powertrain operation from a first mode to a second mode, increase a battery state of charge target based on an electric propulsion torque availability and an expected engine torque lag to increase the electric propulsion torque availability as compared to the first mode.

2. The vehicle of claim 1 wherein increasing the battery state of charge target includes increasing a lower limit associated with the battery state of charge target.

3. The vehicle of claim 1 wherein the controller is further programmed to output for display an indicator indicative of an increased battery state of charge target.

4. The vehicle of claim 1 further comprising a friction element configured to selectively couple the engine and electric machine, wherein the controller is further programmed to, in response to an accelerator pedal position falling below a threshold while the powertrain is operating in the second mode and the engine is operating and coupled to the electric machine, decrease a pressure associated with the friction element to decouple the engine from the electric machine and continue operating the engine.

5. The vehicle of claim 4 wherein the friction element includes first and second components spaced apart from one another and configured to synchronously rotate while the engine is operating and decoupled from the electric machine.

6. The vehicle of claim 5 wherein the controller is further programmed to decrease the pressure such that the first and second components are held near a touch point while the engine is operating and decoupled from the electric machine.

7. The vehicle of claim 4 wherein the controller is further programmed to, in response to the accelerator pedal position exceeding the threshold, increase the pressure to couple the engine to the electric machine.

8. The vehicle of claim 7 wherein the controller is further programmed to, in response to coupling the engine to the electric machine, operate the electric machine to provide a propulsion torque based on a state of charge of the battery and the accelerator pedal position.

9. A vehicle comprising:
a controller programmed to,
in response to a transition from a first powertrain operating mode to a second powertrain operating mode, operate an engine and electric machine to increase a state of charge target of a traction battery to increase propulsion torque available from the electric machine, wherein the state of charge target of the traction battery is based on an electric propulsion torque availability and an expected engine torque lag; and
in response to a decrease in accelerator pedal position and a vehicle speed being less than a threshold speed while a powertrain of the vehicle is operating in the second powertrain operating mode and the engine and electric machine are coupled via a friction element, decrease a pressure of the friction element to a first target pressure to decouple the engine from the electric machine.

10. The vehicle of claim 9 wherein the controller is further programmed to, in response to the vehicle speed being less than the threshold speed and a state of charge being greater than the state of charge target, decrease the pressure to a second target pressure less than the first target pressure, and shut down the engine.

11. The vehicle of claim 9 wherein the controller is further programmed to, in response to a decrease in the accelerator pedal position and the vehicle speed being greater than a threshold speed while the powertrain is operating in the second powertrain operating mode, maintain the pressure.

12. The vehicle of claim 9 wherein the friction element includes a first component spaced apart from a second component and the controller is further programmed to, in response to a decrease in the accelerator pedal position and the vehicle speed being less than a threshold speed while the powertrain is operating in the second powertrain operating mode, decrease the pressure such that the first component and second component are released proximate a touch point.

13. The vehicle of claim 12 wherein the engine is operated to rotate the first component and the electric machine is operated to rotate the second component such that the first and second components are synchronously rotated while the engine is decoupled from the electric machine.

14. The vehicle of claim 12 wherein the controller is further programmed to, in response to the accelerator pedal position exceeding a threshold, increase the pressure and operate the engine and the electric machine to satisfy a demand for torque from the powertrain associated with the accelerator pedal position.

15. A method of controlling a vehicle comprising:
in response to a transition from a first powertrain operating mode to a second powertrain operating mode, increasing a traction battery state of charge target, wherein the traction battery state of charge target is based on an electric propulsion torque availability and an expected engine torque lag;
operating a powertrain to achieve the traction battery state of charge target; and
in response to a decrease in accelerator pedal position and a vehicle speed being less than a threshold, decreasing a pressure of a friction element configured to selectively couple an engine and transmission of the powertrain such that no torque is transmitted to the transmission by the engine while the engine continues operating.

16. The method of claim 15 wherein the pressure is decreased such that a first and second component of the friction element are held proximate a touch point while the engine is operating and decoupled from the transmission.

17. The method of claim 15 wherein increasing the traction battery state of charge target includes maintaining a traction battery state of charge upper limit and increasing a traction battery state of charge lower limit.

18. The method of claim 15 further comprising
in response to the accelerator pedal position exceeding a threshold, increasing the pressure to couple the engine to the transmission, and
operating the powertrain to satisfy a demand associated with the accelerator pedal position.

* * * * *